April 14, 1970 D. J. SIKORRA 3,506,904
SELF-STARTING DC TO DC CONVERTERS
Filed Feb. 19, 1968
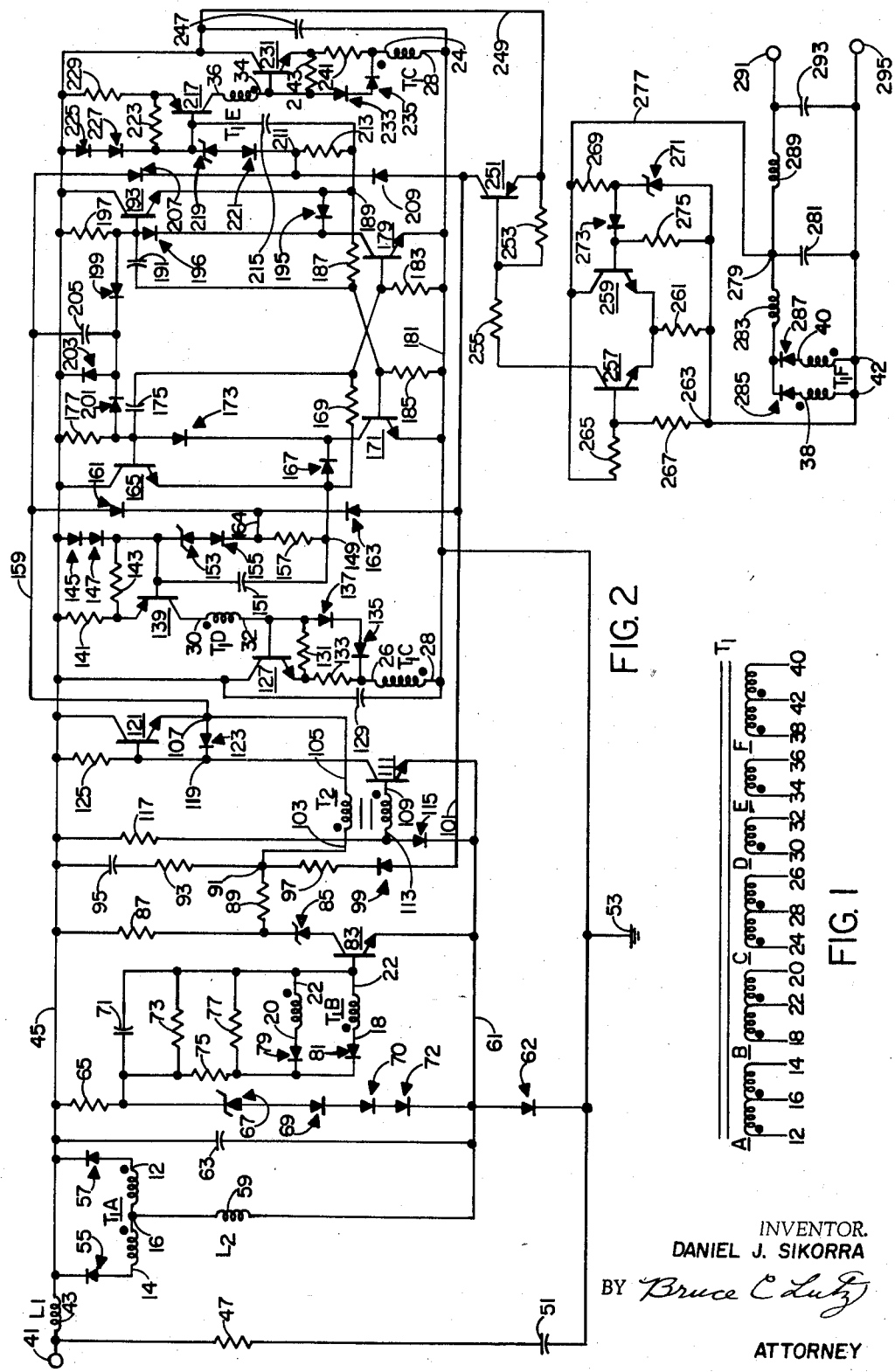
INVENTOR.
DANIEL J. SIKORRA
BY Bruce C Lutz
ATTORNEY

United States Patent Office 3,506,904
Patented Apr. 14, 1970

3,506,904
SELF-STARTING DC TO DC CONVERTERS
Daniel J. Sikorra, Champlin, Minn., assignor to Honeywell Inc., Minneapolis, Minn., a corporation of Delaware
Filed Feb. 19, 1968, Ser. No. 706,415
Int. Cl. H02m 3/22
U.S. Cl. 321—2                                 5 Claims

ABSTRACT OF THE DISCLOSURE

A self-starting DC to DC converter wherein a feedback signal from a power transformer is compared to a reference level to generate a control signal which is used to control the power to the primary winding of a power transformer.

THE INVENTION

The invention herein described was made in the course of or under a contract or subcontract thereunder, with the Department of the Air Force.

The present invention pertains to the field of electricity conversion systems and more particularly to electricity conversion systems having plural current conversions.

There are many electrical systems where there is a need for a plurality of precise DC voltages. For example, a spacecraft system may require several precision DC voltage levels although the power producing unit carried aboard the spacecraft produces power at a single poorly regulated DC voltage.

It is an object of this invention to provide an improved regulated DC to DC converter.

It is a further object of this invention to provide a DC to DC converter which provides separate levels of output, mutually isolated from each other and from the primary system.

Further objects and advantages become apparent from a reading of the specification and claims in conjunction with the drawings wherein:

FIGURE 1 is a schematic drawing of the transformer used in the present invention showing the phasing relationship between the various transformer windings.

FIGURE 2 is a detailed schematic of a preferred embodiment of the present invention.

In FIGURE 1 windings A, B, C, D, E, and F of a transformer $T_1$ are shown. Transformer $T_1$ is a high frequency transformer whose core may be made of a toroidally wound material such as low loss square loop high frequency molypermalloy tape. Winding A of transformer $T_1$ has a dot marked terminal 12, an unmarked terminal 14 and a center tap terminal 16. In the transformer diagram herein shown, a dot is placed at one terminal of each pair of terminals. A current driven into a dot marked terminal will induce a current to flow from the dot marked terminal of a winding on the same core. Winding B has a dot marked terminal 18, an unmarked terminal 20 and a center tapped terminal 22. Winding C has a dot marked terminal 24, an unmarked terminal 26 and a center tap 28. Winding D has a dot marked terminal 30 and a terminal 32. Winding E has a dot marked terminal 34 and a terminal 36. Winding F has a dot marked terminal 38, an unmarked terminal 40 and a center tapped terminal 42. The windings of transformer $T_1$ are shown in FIGURE 2 labeled with the terminal designations of FIGURE 1 and the symbol $T_1$ plus the appropriate letter designation for the winding.

In FIGURE 2 an unregulated source of DC power is connected to terminal 41 which is connected through an inductor $L_1$ 43 to a conductor 45 and is also connected through a resistor 47 to one terminal of capacitor 51 the other end of which is connected to ground or a reference potential means 53. Conductor 45 is connected to the cathodes of diodes 55 and 57, the anodes of which are respectively connected to terminals 14 and 12 of transformer winding $T_1A$. The direction of easy current flow as used herein is from anode to cathode of a diode. The center tap terminal 16 of transformer winding $T_1A$ is connected to one end of an inductor $L_2$ 59, the other end of which is connected to a conductor 61. Conductor 61 is connected to ground 53 through a diode 62 poled for easy current flow into ground 53. A capacitor 63 is connected between conductor 45 and conductor 61. One end of a resistor 65 is connected to conductor 45 and the other end is connected to a cathode of a Zener diode 67 the anode of which is connected to one end of a series connection of diodes 69, 70, and 72 the other end of which is connected to conductor 61, the direction of easy current flow through the series connected diodes being from the Zener diode 69 toward conductor 61. The other end of the resistor 65 is also connected to the cathode of diode 67, one end of a resistor 73 and one end of a resistor 75. The other ends of capacitor 71 and resistor 73 are connected together and to one end of a resistor 77, the other end of which is connected to the other end of resistor 75. The other end of resistor 75 is also connected to the cathodes of diodes 79 and 81, the anodes of which are connected respectively to terminals 20 and 18 of transformer winding $T_1B$, the center tap terminal 22 of which is connected to the common ends of resistor 77 and 73 and to a base of an NPN transistor 83. An emitter of transistor 83 is connected to conductor 61 and a collector is connected to an anode of a Zener diode 85, the cathode of which is connected to one end of a resistor 87 and also to one end of a resistor 89. The other end of resistor 87 is connected to conductor 45 and the other end of resistor 89 is connected to a junction point 91.

Junction point 91 is connected to conductor 45 through a series combination of a resistor 93 and a capacitor 95. Junction point 91 is also connected through a resistor 97 to the cathode of a diode 99 the anode of which is connected to a conductor 101. Junction point 91 is also connected to a dot marked terminal or end 103 of a primary transformer winding of a saturable core transformer $T_2$ and the unmarked other end or terminal 105 of which is connected to a junction point 107. A secondary winding of transformer $T_2$ having a dot marked terminal or end 109 is connected to a base of an NPN transistor or switching means 111 and an unmarked other end or terminal 113 is connected to an anode of a diode or unidirectional current conducting means 115, the cathode of which is connected to conductor 61. Terminal 113 is also connected through a resistor 117 to conductor 45. A collector of transistor 111 is connected to a junction point 119 which is also connected to a base of an NPN transistor or switching means 121, a cathode of a diode or unidirectional current conducting means 123 the anode of which is connected to an emitter of transistor 121, and to one end of a resistor 125, the other end of which is connected to conductor 45. A collector of transistor 121 is connected to conductor 45.

An NPN transistor 127 has a collector connected to conductor 45 and to one side of a capacitor 129 the other side of which is connected to a center tapped terminal 28 of transformer winding $T_1C$. A resistor 131 is connected between an emitter and a base of transistor 127. A resistor 133 is connected between the emitter of transistor 127 and a terminal 26 of transformer winding $T_1C$. Terminal 26 is also connected to a series combination of two diodes 135 and 137 which are oriented with the direction of easy current flow from the base of transistor 127. The base of transistor 127 is also connected to terminal 32 of winding $T_1D$. Terminal 30 of winding $T_1D$ is connected to a collector of a PNP transistor 139, the emitter of which is connected to one end of a resistor 141 and also to one end of a resistor 143. The other end of resistor 141 is connected to conductor 45 and the other end of resistor 143 is connected to a base of transistor 139. The base of transistor 139 is also connected to conductor 45 through a series combination of two diodes 145 and 147 which are connected with the direction of easy current flow from conductor 45 to the base.

The base of transistor 139 is also connected to a junction point 149 through a parallel combination of a capacitor 151 and a series combination of a Zener diode 153 which has its cathode connected to the base of transistor 139, a diode 155 which has its anode connected to the anode of Zener diode 153 which has its anode connected to the anode of Zener diode 153 and resistor 157. Junction point 107 is connected to a conductor 159 which is connected to an anode of a diode 161, a cathode of which is connected to a cathode of a diode 163, the anode of which is connected to conductor 101. The cathodes of diodes 155 and 163 are connected together by a conductor 164. Junction point 149 is connected to an emitter of an NPN transistor 165 the collector of which is connected to conductor 45. Junction point 149 is also connected to an anode of a diode 167 and one end of a resistor 169. A cathode of diode 167 is connected to a collector of an NPN transistor 171 which is also connected to a cathode of a diode 173 an anode of which is connected to a base of transistor 165.

A capacitor 175 is connected between the base of transistor 165 and the other end of resistor 169. A resistor 177 is connected between the base of transistor 165 and conductor 45. The common point between resistor 169 and capacitor 175 is connected to a base of an NPN transistor 179, an emitter of which is connected in common with the emitter of transistor 171 to a conductor 181 which is connected to ground 53. A resistor 183 is connected between the base and emitter of transistor 179 and a resistor 185 is connected between a base and emitter of transistor 171. The base of transistor 171 is connected through a resistor 187 to a junction point 189 and also through a capacitor 191 to a base of an NPN transistor 193. A collector of transistor 193 is connected to conductor 45 and an emitter is connected to junction point 189 and also to an anode of a diode 195, a cathode of which is connected to a collector of transistor 179.

The base of transistor 193 is connected to the collector of transistor 179 through a diode 196 with the direction of easy current flow toward the collector. The base of transistor 193 is also connected through a resistor 197 to conductor 45. The base of transistor 193 is also connected to an anode of a diode 199 and the base of transistor 165 is connected to an anode of a diode 201. The cathodes of diodes 199 and 201 are connected in common to an anode of a diode 203, the cathode of which is connected to conductor 45. The anode of diode 203 is also connected through a capacitor 205 to conductor 159. Conductor 159 is also connected to an anode of a diode 207, the cathode of which is connected to a cathode of a diode 209, the anode of which is connected to conductor 101. The cathodes of diodes 207 and 209 are connected to a junction point 211. A resistor 213 is connected between junction point 189 and junction point 211.

A capacitor 215 is connected between junction point 189 and a base of a PNP transistor 217. A cathode of a Zener diode 219 is connected to the base of transistor 217 and an anode is connected to an anode of a diode 221. The cathode of the diode 221 is connected to junction point 211. A resistor 223 is connected between the base and an emitter of transistor 217. A series combination of diodes 225 and 227 is connected between conductor 45 and the base of transistor 217 with the direction of easy current flow from conductor 45 to the base. The emitter of transistor 217 is connected through a resistor 229 to conductor 245. A collector of transistor 217 is connected to a terminal 36 of transformer winding $T_1E$, terminal 34 of which is connected to a base of an NPN transistor 231, a collector of which is connected to conductor 45. The base of transistor 231 is also connected to a series connection of diodes 233 and 235 which are connected to one end of a resistor 241 with the direction of easy current flow being from the base of transistor 231 to resistor 241. The other end of resistor 241 is connected to an emitter of transistor 231 which is also connected through a resistor 243 to the base of transistor 231. A common point between diode 235 and resistor 241 is connected to terminal 24 of transformer winding $T_1C$, terminal 28 of which is connected to conductor 181. A capacitor 247 is connected between the collector of transistor 231 and terminal 28.

A conductor 249 is connected between the collector of transistor 231 and an emitter of a PNP transistor 251, the collector of which is connected to conductor 101. A resistor 253 is connected between the emitter and a base of transistor 251. A resistor 255 is connected between the base of transistor 251 and a collector of an NPN transistor 257, the emitter of which is connected to an emitter of an NPN transistor 259. The common emitters of transistor 257 and 259 are connected through a resistor 261 to a junction point 263. A collector of transistor 259 is connected through a resistor 265 to a base of transistor 257 and the base is connected through a resistor 267 to junction point 263. The collector of transistor 259 is also connected through a resistor 269 to a cathode of a Zener diode 271, the anode of which is connected to terminal 263. The cathode of Zener diode 271 is also connected to an anode of a diode 273, the cathode of which is connected to a base of transistor 259 and also to one end of a resistor 275 the other end of which is connected to junction point 263.

A conductor 277 is connected between the collector of transistor 259 and a junction point 279 which is connected to one end of a capacitor 281. Junction point 279 is connected through an inductor 283 to common cathodes of diodes 285 and 287, the anodes of which are respectively connected to the dot marked terminal 38 and the terminal 40 of transformer winding $T_1F$, terminal 42 of which is connected to the other end of capacitor 281. An inductor 289 is connected between junction point 279 and a DC output terminal 291 and a capacitor 293 is connected between terminal 291 and terminal 295, a DC return terminal which may be directly connected to ground 53.

OPERATION

DC input power filter and self-excitation supply

An unregulated DC voltage is applied to terminal 41 of FIGURE 2. In a typical application this voltage may be 28 volts nominally and subject to variation between 18 and 32 volts DC. The DC voltage applied to terminal 41 is filtered by inductor 43. The filtered but unregulated DC voltage appears on conductor 45.

The $T_1A$ transformer windings, diodes 55 and 57 and inductor 59 comprise a self-excitation supply. When the converter is in operation an AC voltage from transformer $T_1$ appears across the $T_1A$ winding and is rectified by diodes 55 and 57. A resultant rectified signal appears at terminal 16 of winding $T_1A$ and is average value filtered by the action of inductor 59 and capacitor 63. Conductor 61 is connected to the point of connection of capacitor 63 and inductor 59 and carries a filtered negative DC voltage with respect to conductor 45 whose magnitude in an illustrative example might be −35 volts.

Reference feedback and error amplifier

The self-excitation supply described in the previous paragraph is used to power a reference feedback and error amplifier or comparator. A reference voltage is derived by a voltage divider comprised of resistor 65. Zener diode 67 and one or more temperature compensating diodes such as diode 69, 70 and 72. A temperature compensated reference voltage is derived at the cathode of Zener diode 67 and is conducted to the base of transistor 83 through a filter network comprised of capacitor 71 and resistors 73, 75, and 77. The reference voltage is algebraically summed at the base of transistor 83 with an opposing signal from the feedback windings $T_1B$ of the power transformer $T_1$.

When the converted is operating, the windings $T_1B$ carry an AC signal proportional to the level of flux in the transformer core. The AC signal carried by windings $T_1B$ is rectified by diodes 79 and 81. The signal appearing at the collector of transistor 83 will vary in accordance with the difference between the average value rectified and filtered feedback signal and the reference signal. An error amplifier or comparator output signal is derived from the cathode of Zener diode 85 which has its anode connected to the collector of transistor 83. This Zener diode maintains the minimum level signal at the output of the error amplifier at a value no less than the collector to emitter saturation voltage of transistor 83 plus the reverse breakdown voltage of Zener diode 85. In a typical circuit a 6.2 volt Zener diode might be used to obtain an amplifier error output which would range from about 7 volts to 35 volts with respect to conductor 61.

Pulse width oscillator-modulator

The output signal from the reference feedback and error amplifier is connected to input resistor 89 of the pulse width oscillator-modulator circuit.

The output signal from the reference feedback and error amplifier is connected to input resistor 89 of the pulse width oscillator-modulator circuit which converts the analog error voltage from the error amplifier into a bipolar signal at terminal 107 having a duty cycle of low amplitude output to high amplitude output determined by the magnitude of the error voltage applied to resistor 89.

In explaining the operation of the oscillator-modulator it may be initially assumed that the output at terminal 107 is in the high amplitude output condition which is produced when transistor 121 is in an ON condition. The potential at junction 107, less the potential at junction 91 applied across the primary winding of $T_2$ tends to increase the magnetic flux in the core of $T_2$. The increasing flux in the core of transformer $T_2$ induces a voltage in the secondary winding which opposes current flow into the secondary winding through terminal 113 and back biases the base of transistor 111 turning it OFF and causing all of the current passing through resistor 125 to enter the base of transistor 121 causing that transistor to saturate and allowing the emitter voltage at terminal 107 to reach approximately the same potential as conductor 45.

The rate of increase of the flux of a transformer core is governed by the voltage applied across the transformer winding. The voltage applied across the primary winding of transformer $T_2$ is approximately equal to the voltage on conductor 45 minus the error voltage applied to resistor 89. If the voltage applied across the primary winding is substantially invariant the rate of increase of the flux in the core will be constant. The time required for the flux to reach the positive saturation level of the core is proportional to the inverse of the voltage across the primary winding, which in the present example, is the difference between the voltage on conductor 45 and the error voltage applied to resistor 89.

When the flux level in the core of the transformer $T_2$ is sufficient to saturate the core, the magnetic field begins to collapse, inducing a voltage on the primary winding which tends to turn transistor 111 ON. When transistor 111 turns ON it clamps the base of transistor 121 close to the potential of conductor 61, back biasing the base emitter junction and cutting OFF the flow of current through transistor 121 to the primary winding of transformer $T_2$. The voltage applied across the primary winding after transistor 121 turns OFF is approximately equal to the error voltage applied to resistor 89. The time required for the transformer core to reach the negative saturation level is inversely proportional to the error voltage. When negative saturation occurs the flux in the transformer core collapses inducing a voltage on the secondary winding which back biases the base emitter junction of transistor 111 and turns it OFF. As transistor 111 turns OFF the voltage at the base of transistor 121 increases turning transistor 121 ON completing one cycle of operation and establishing the same operating conditions initially assumed.

From the foregoing description of the operation of the oscillator-modulator it can be seen that the relative duty cycle of high voltage output signals to low voltage output signals may be varied by varying the magnitude of the error signal. An increase in the magnitude of the error signal increases the time that the output signal is at a low level. The output voltage has equal duty cycles for the high and low amplitude output when the error signal is equal to one half of the voltage between conductor 45 and conductor 61.

Bistable multivibrator

Transistors 165, 171, 179, and 193 comprise a bistable multivibrator or flip-flop. A bipolar output signal from terminal 107 of the oscillator-modulator is connected through conductor 159 to capacitor 205 which AC couples the signal to the flip-flop input. Positive input pulses are clamped to the potential of conductor 45. Negative input pulses are connected to the cathodes of the steering diodes 199 and 201. If we assume initially that transistor 193 is ON, a current will flow through transistor 193 to terminal 189 and then through resistor 187 turning transistor 171 ON by forward biasing its base. When transistor 171 is turned ON its collector is clamped to a low voltage and the base of transistor 165 is also clamped to a low voltage through diode 173. Because the base of transistor 165 is clamped to a low voltage it is back biased and transistor 165 is in the OFF condition. When transistor 165 is OFF no base current is applied to transistor 179 and it also is in the OFF condition. Thus, when transistor 193 is turned ON transistor 171 is also ON and transistors 165 and 179 are OFF. When a negative pulse is applied to capacitor 205, diode 199 is forward biased and diverts the current which is flowing to the base of transistor 193 through resistor 197. No current flows through diode 201 because the anode of diode 201 is clamped to a low potential by transistor 171. As the base current of transistor 193 is reduced, the transistor begins to turn OFF and the base current to transistor 171 begins to decrease causing transistor 171 to turn OFF. As transistor 171 turns OFF its collector voltage rises and current begins to flow into the base of transistor 165 through resistor 177. The increasing base current in transistor 165 to turn ON and drive a current through resistor 169 and into the base of transistor 179 turning it ON. As transistor 179 begins to turn ON it further shunts base current from the base of transistor 193. The switching action is thus regenerative; once the current through the base of transistor 193 is reduced by the pulse applied through capacitor 205 the overall circuit acts to turn transistors 193 and 171 OFF and transistors 165 and 179 ON even after removal of the input pulse. After the flip-flop is stabilized in the new operating condition a subsequent negative pulse will by similar means switch the flip-flop back into the original state. Capacitors 175 and 191 and diodes 167 and 195 are used to enhance the switching speed of the flip-flop.

Two stage power gate

Transistors 139 and 127 comprise a power gate which drives half of the power transformer primary winding $T_1C$. Transistors 217 and 231 comprise a power gate which drives the other half of power transformer primary winding $T_1C$. The power gate acts to alternately switch power to the two halves of the primary transformer winding in response to signals generated by the oscillator-modulator, the flip-flop and an overvoltage limiter the operation of which will be discussed later.

The flip-flop output voltage is connected from terminal 189 through a resistor 213 to a junction 211. The output voltage of the oscillator-modulator at terminal 104 is conducted along conductor 159 through diode 207 to junction 211. A signal from the overvoltage limiter is conducted through diode 209 to junction point 211. The function of the overvoltage limiter will be discussed later but for the purposes of this explanation the overvoltage limiter may be assumed to apply a high voltage to diode 209 if and when the output voltage derived from the inverter is excessive. When normal output voltage conditions exist, no voltage is applied to diode 209 and junction point 211 will remain at a low voltage if the oscillator-modulator output is in the low voltage condition with respect to line 61 and transistors 165 and 179 of the flip-flop are in the ON state. When junction 211 is at a low voltage a current will flow through resistors 229, the base emitter junction of transistor 217, Zener diode 219 and diode 221. The base current in transistor 217 turns that transistor ON and forces a current through the transformer compensating winding $T_1E$ to the base of transistor 231. The current flowing in the base of transistor 231 turns the transistor ON and drives current through resistor 241 and through one half of the primary winding $T_1C$.

As the current begins to increase in the winding $T_1C$, a compensating current is induced in winding $T_1E$ which tends to drive a larger current into the base of transistor 231 causing the transistor to saturate. This positive feedback action reduces the power dissipation of transistors 231 by forcing it into saturation. Resistor 241 is used in conjunction with diodes 233 and 235 and acts to limit the amount of current that may be driven through transistor 231. Capacitor 247 is used to reduce electromagnetic interference because of the switching action.

When the oscillator-modulator output signal switches from a low voltage to a high voltage, junction point 211 is biased to a high voltage and the base of transistor 217 is zero biased, turning the transistor OFF and removing the current drive from transistor 231 turning it OFF.

Thus, the operator of each power gate may be summarized as driving current to one half of a primary transformer winding when the flip-flop output is at a low voltage and when the oscillator output is also at a low voltage. Since the flip-flop changes state when the oscillator switches from a high output voltage to a low output voltage, the power gate will turn ON when the oscillator switches to a low output voltage and will turn OFF when the oscillator switches back to a high output voltage. The time duration that the oscillator remains in a low output voltage condition is determined by the error signal developed by the error amplifier by comparing the average level in the power transformer core to the reference voltage. The flip-flop acts to commutate the pulse width modulator error signal from the oscillator-modulator so that the two halves of the transformer primary winding are driven alternately. The operation of the power gate comprising transistors 129 and 137 is completely analogous to the operation of the power gate described above.

DC output supply and overvoltage limiter

Winding $T_1F$ of transformer $T_1$ is a center tapped secondary winding which may be used to provide power for a controlled DC supply. Diodes 285 and 287 act to rectify the AC voltage across winding $T_1F$. The rectified unfiltered voltage at the cathodes of diodes 285 and 287 is filtered by inductors 283 and 289 and capacitors 281 and 293. The inductors and capacitors comprise a filter to eliminate the ripple resulting from the rectification of a voltage across winding $T_1F$. A filtered and regulated DC voltage is provided at output terminal 291.

The voltage at junction point 279 is connected by conductor 277 to a collector of transistor 259 and through a resistor 265 to the base of transistor 257. If the voltage at junction point 279 exceeds a predetermined voltage, transistor 257 is turned ON and turns transistor 251 ON to conduct a positive voltage to the power gates causing the power gates to be turned OFF. The overvoltage limiter is capable of overriding any failures in the reference circuitry, the feedback circuitry, the error amplifier, or the oscillator-modulator which may otherwise tend to cause an unwanted overvoltage.

Self-starting provisions

Although the converter utilizes voltage produced at the output at windings $T_1A$ to provide an internal regulated power supply, the circuit is self-starting. When a DC power source is initially connected to terminal 41, no voltage is initially produced by the internal power supply. The reference amplifier and oscillator, the elements normally powered by the internal power supply, are powered by the unregulated voltage applied to terminal 41 and a ground is supplied to the circuitry by conductor 61 which is connected through diode 62 to ground 53. After the converter has begun to operate, voltages are produced across transformer winding $T_1A$ and the internal DC voltage is supplied causing conductor 61 to assume a potential below ground potential thereby back biasing diode 62 and establishing a potential between conductor 45 and conductor 61 which is regulated.

SUMMARY

The DC to DC converter thus filters the unregulated DC power and alternately applies it to both halves of the transformer primary winding $T_1C$ to produce an AC flux in the core of transformer $T_1$. The AC output voltage of secondary winding $T_1F$ is average value rectified and filtered to produce a DC output voltage.

A feedback signal representative of the level of flux in the transformer core $T_1$ and thus of the DC output is compared with a reference voltage producing an error voltage at the collector of transistor 83. The error voltage is used to control the duty cycle of the oscillator-modulator comprising transistors 111 and 121 and transformer $T_2$. The duty cycle modulated output of the oscillator-modulator is connected to the input of the flip-flop or commutation means, causing the flip-flop to change state each time a negative slope appears in the output voltage. Each output of the flip-flop is combined with oscillator output voltage and used to drive one of two power gates which alternately apply pulse-width modulated signals to the primary winding $T_1C$ and act to produce a regulated flux level in the core of $T_1$.

It is obvious that many modifications and alterations of the above circuit may be made without departing from the present invention. For example, one or more secondary windings such as winding $T_1F$ may be added to provide a larger number of independent DC power supplies which may be operated at different voltage levels and isolated from the power ground. The overvoltage limiter shown in the specification may be used to provide an overvoltage limiting function when output voltages from several independent DC supplies are summed on conductor 277.

Other alterations and variations will be obvious to those skilled in the art.

I claim:
1. In a power conversion system including a transformer having a core and a plurality of windings, apparatus for producing a controlled alternating flux in the core of said transformer comprising in combination:
   an external source of unregulated DC power;
   an internal source of regulated DC voltage;

switchable power gate means including input means for selectively connecting said external source of unregulated DC power to at least one of the windings of the transformer in response to signals applied to the input means;

comparator means powered by said internal source of regulated DC voltage and including input means and output means, the input means of said comparator means connected to at least one winding of said transformer means to receive an output signal therefrom indicative of the alternating flux in the core of said transformer, the output of said comparator means carrying an error signal proportional to the difference between the output signal of said comparator means and a predetermined reference signal level;

oscillator-modulator means powered by said internal source of regulated DC voltage and receiving the output of said comparator means and producing at an output terminal, a periodic output signal characterized by a first and a second output signal level, the relative duty cycle of the first signal level relative to the second signal level being proportional to the error signal received from said comparator;

commutation means including input means and output means, the input means of said commutation means connected to the output terminal of said oscillator-modulator means for receiving the periodic output signal of said oscillator-modulator means, said commutation means alternately producing pulses having a time duration determined by the time duration that the output signal of said oscillator-modulator means remains in the first signal level; and means for connecting the output signals of said commutation means to said switchable power gate means.

2. Apparatus of the class described in claim 1 wherein said internal source of regulated DC voltage comprises, in combination:

at least one of the winding of said transformer; and unidirectional current conducting means connected to said windings for providing a DC voltage.

3. Apparatus of the class described in claim 1 wherein said comparator means comprises in combination:

a source of reference potential comprising controlled voltage breakdown means;

means for connecting said controlled voltage breakdown means to said external source of DC power;

feedback signal supplying means providing a unidirectional signal indicative of the flux level in the core of said transformer and comprising at least one transformer winding and unidirectional current conducting means connected to said transformer winding to provide said unidirectional signal; and summing means receiving the signals from said source of reference potential and said unidirectional signal supplying means to provide an error signal proportional to the difference between said reference potential and the average value of said feedback signal.

4. Apparatus of the class described in claim 1 wherein one or more of the windings of said transformer are connected to a rectifier means and a filter means for providing a controlled unidirectional output signal.

5. Apparatus of the class described in claim 4 wherein overvoltage protection means are connected to measure said regulated DC output voltage and to disable said oscillator-modulator means and said commutation means when the controlled unidirectional output signal exceeds a predetermined value.

References Cited
UNITED STATES PATENTS

| | | | |
|---|---|---|---|
| 3,373,334 | 3/1968 | Geisz et al. | 321—2 |
| 3,419,781 | 12/1968 | Jullien-Davin | 321—2 |
| 3,439,251 | 4/1969 | Schaefer | 321—2 X |

W. M. SHOOP, JR., Primary Examiner

W. H. BEHA, JR., Assistant Examiner

U.S. Cl. X.R.

307—275; 321—18; 331—111